United States Patent [19]
Schulz

[11] 3,870,811
[45] Mar. 11, 1975

[54] PROCESSES FOR THE PRODUCTION OF PROTEIN-RICH FOODSTUFFS FROM NATURAL PROTEIN-CONTAINING FOODS THAT ARE SUBJECT TO SYNERESIS

[75] Inventor: Max Erich Schulz, Ascheberg, Germany

[73] Assignee: Gervais-Danone AG, Munich, Germany

[22] Filed: Apr. 26, 1974

[21] Appl. No.: 464,688

Related U.S. Application Data

[63] Continuation-in-part of Ser. No. 254,794, April 17, 1972, abandoned.

[30] Foreign Application Priority Data
Apr. 16, 1971 Germany.............................. 2118532

[52] U.S. Cl................. 426/348, 426/185, 426/188, 426/212, 426/356, 426/361, 426/364, 426/385
[51] Int. Cl............................. A23j 3/00, A23l 1/00
[58] Field of Search .......... 426/356, 361, 364, 350, 426/212, 348, 185, 188, 385

[56] References Cited
UNITED STATES PATENTS

| | | | |
|---|---|---|---|
| 3,197,310 | 7/1965 | Kjelson | 426/212 |
| 3,333,965 | 8/1967 | Kurtzhalts | 426/165 |
| 3,594,192 | 7/1971 | Mullen et al. | 426/364 X |
| 3,713,837 | 1/1973 | Leidy et al. | 426/364 |
| 3,719,498 | 3/1973 | Leidy et al. | 426/350 |
| 3,719,499 | 3/1973 | Hai et al. | 426/350 |

Primary Examiner—James R. Hoffman
Attorney, Agent, or Firm—Michael S. Striker

[57] ABSTRACT

A process for producing a foodstuff containing a high content of protein in the form of a cake or loaf that can be cut into firm slices and which can be further cooked by boiling, baking, roasting, sauteeing, or deep frying without crumbling which comprises preparing an intimate mixture consisting essentially of an albumin or globulin and a water-containing natural protein-containing food that is subject to syneresis such as milk curds containing casein, milk curd coprecipitates containing casein and lactalbum, denatured whey protein, fresh and ripened cheeses, and soybean curd, in which mixture the ratio of albumin or globulin to the other protein, which show syneresis, on a dry-weight basis is between 20:80 and 50:50, placing the same mixture into a mold or container and heating the mixture therein at a temperature between 80° and 100°C for a period between 5 and 60 minutes.

10 Claims, No Drawings

PROCESSES FOR THE PRODUCTION OF PROTEIN-RICH FOODSTUFFS FROM NATURAL PROTEIN-CONTAINING FOODS THAT ARE SUBJECT TO SYNERESIS

REFERENCE TO RELATED APPLICATIONS

This application is a continuation-in-part of my application Ser. No. 254,794, filed Apr. 17, 1972 and now abandoned.

BACKGROUND OF THE INVENTION

The present invention pertains to processes for the production of protein-rich foodstuffs from natural edible protein-containing foods that are subject to syneresis, particularly when heated. Syneresis refers to the separation of a liquid from a gel by contraction. Natural edible protein-containing foods which are subject to syneresis include such foods as milk curds containing casein, particularly curds from bovine milk, which curds may have been produced by coagulation of such milks with mineral or other acids, or by the action of rennet or enzymes such as rennin; or milk curd co-precipitates which are precipitates containing calcium, casein, and lactalbumin which are produced, for example, by the addition of calcium chloride to warm bovine milk; denatured proteins from coagulated whey; fresh curd cheeses such as cottage cheese and cream cheese; ripened soft and hard cheeses such as cheddar, emmental and the like, as well as tofu which is known also as soybean curd, all of which protein-containing foods include substantial proportions of water and, because they synerize, become unappetizing and unattractive after standing or storage. These proteins, as such, except for the hard cheeses, cannot readily be formed into firm patties, cakes, or loaves that can be cut into slices or molded into firm balls or bodies having other shapes, and are generally sold and packaged in the same manner as are other pasty or wet solid foodstuffs.

Since milk curd as such cannot be boiled, baked, roasted, sauteed, or deep fried, methods of modifying such milk curds to change their characteristics in this respect have heretofore been tried. A method of spinning casein into plastic fibers which could then be formed into a product which had a meat-like texture had heretofore also been suggested but this product has not achieved any substantial commercial success. Methods have also been described for treating proteins which synerize to improve their storage life by cutting the curd into pieces of suitable sizes and frying these pieces in hot oil that is maintained at a temperature between 180° and 185°C. In such methods, however, the curd has a tendency to become rubbery and unpalatable.

SUMMARY OF THE INVENTION

An object of the present invention is to provide a process for the incorporation of such protein-containing natural foodstuffs that are subject to syneresis into a product that does not synerize and can be shaped or molded into firm patties, cakes, or loaves that can be cut into slices and which can be boiled, baked, roasted, sauteed, or deep fried without crumbling. The products of the present invention may be cooked prior to serving by boiling, baking, roasting, sauteeing or deep frying them without crumbling into small pieces. The products of the present invention have a firmer texture and present a more attractive and appetizing appearance and, because of the other ingredients with which they may be combined, are more palatable than the proteins that synerize from which they are prepared.

In accordance with the process of the present invention, edible water-containing natural protein-containing foods which synerize such as milk curds are combined with an albumin or globulin that is coagulable by heat in amounts corresponding to ratios on a dry-weight basis between 20:80 and 50:50 of albumin or globulin to the other protein that synerizes. Ratios between 30:70 and 40:60 of albumin to the other protein that synerizes are generally adequate and are accordingly preferred. The albumin or globulin and other proteins are generally intimately mixed together with seasoning or flavoring ingredients. Other ground or chopped foodstuffs, such as slices or chips or fruits, as well as other proteins such as ground or shredded meats and fish, may be included in the mixture. The mixture is then placed into a container of the desired shape and heated therein for a short period to coagulate the albumin or globulin therein until the molded or shaped cake or loaf has a firm texture and can be cut into slices without crumbling. Heating at a temperature between 80° and 100°C for a period between approximately 5 and approximately 60 minutes is generally sufficient to produce a product having the desired rigidity or firmness.

Albumins and globulins are defined as simple proteins that are coagulable by heat. Those which are eminently suitable for the preparation of the products of the present invention are, for example, hen and duck egg whites, lactalbumin, and blood albumins.

Other foodstuffs that may be added to vary the consistency or texture of the products include starches, wheat flour, and grits, groats, and flours of other grains. The texture or porosity of the products may also be varied by whipping or beating the mixture before it is coagulated.

The heat treatment to which the mixture of albumin or globulin and the protein which synerizes is subjected also has other beneficial effects since it can produce sterilization of the product which thereby extends its storage life. Products that have been heated in sealed containers can be stored for periods of up to one year at room temperature without spoilage.

The mixture can also be extruded into plastic or animal casings to produce sausages which can then be boiled to produce the necessary coagulation of the albumin or globulin in the mixture. The coagulation of the mixture can be effected in molds or containers so as to produce products having any desired shape. The products can be cut into slices or diced. Such diced pieces can be added and cooked in soup stocks to produce soups containing dumplings.

The acidity or hydrogen-ion concentration of the products can also be adjusted to any desired value. They will normally have a hydrogen-ion concentration corresponding to a pH between 4.0 and 6.4, within which range the acidity also contributes a desirable bacteriostatic action to the product.

The fat content of the products can of course be varied by choice of suitable amounts of suitable ingredients.

The products of the invention may be prepared for serving by boiling, baking, roasting, sauteeing and deep frying. They may be sliced into thin slices and deep fried to produce well-browned protein chips that are similar to potato chips.

Although the products of the invention include water, the sliced products can be dried further by freeze-drying or by passing hot air thereover to produce products having longer storage lives. From products that had been dried further in this manner, the original product or a product resembling the original can be reconstituted by the addition of water thereto such as, for example, by spraying the slices with water or by placing the slices into a pan of water.

DETAILED DESCRIPTION AND PREFERRED EMBODIMENTS OF THE INVENTION

The invention is further described and illustrated in the examples which follow, which were selected solely for purposes of illustration and are accordingly not to be construed as limitative of the invention.

EXAMPLE 1

To prepare a cake or loaf containing apples which has a high protein content and which could be sliced and thereafter boiled or baked, the following ingredients were intimately mixed together:
  100 kilograms cottage cheese containing 16 percent protein on a dry-weight basis
  5 kilograms sodium chloride
  50 kilograms sucrose
  100 kilograms sliced apples
  160 kilograms dry powdered hen egg white containing 95 percent by weight of albumin.
  This mixture, in which the ratio of albumin to other proteins which show syneresis is 50:50, was then placed into a metal container and the container was then heated in boiling water for a period of 60 minutes.

The resulting product had the consistency and firmness of edam cheese and, when fried, tasted like a pancake, because it had been sweetened with sugar.

EXAMPLE 2

To prepare a protein-containing sausage which could be divided into smaller portions and fried in fat, and which had the appearance and a taste similar to that of fried hamburger, that is, a fried patty of ground beef, the following ingredients were intimately mixed together:
  800 kilograms cottage cheese containing 18 percent protein on a dry-weight basis
  1.5 kilograms pepper
  1 kilogram powdered caraway seed
  15 kilograms onion salt
  200 kilograms ground beef containing 18 percent protein on a dry-weight basis
  90 kilograms dry powdered hen egg white
The mixture, in which the ratio of albumin to other proteins which show syneresis is 34:66, was then extruded into heat-stable sausage casings and the sausages thus formed were heated in water at a temperature of 90°C for a period of 30 minutes.

The resulting sausages could be cut into slices and be roasted like a meatloaf or schnitzel. They browned well and had a meaty taste.

EXAMPLE 3

A protein-containing cake or loaf that could be molded into balls and cooked in soup stock as a soup dumpling or quenelle was prepared by intimately mixing together the following ingredients:
  600 kilograms milk curd coprecipitate (as described hereinbefore) containing 15 percent protein on a dry-weight basis
  200 kilograms soybean curd containing 15 percent protein on a dry-weight basis
  200 kilograms mashed carrots
  20 kilograms sodium chloride and soup seasonings including celery, onions, and marjoram
  78 kilograms dried powdered hen egg white
  200 kilograms fresh hen egg white containing 11 percent by weight of albumin
The mixture, in which the ratio of albumin to other proteins which show syneresis is 30:60, was then distributed into metal containers having a capacity of 500 grams and heated therein at a temperature of 95°C for a period of 30 minutes.

Small proportions of this mixture were withdrawn with a spoon from the container and formed into small balls which were then dropped into a soup stock and reheated therein again for a short period to provide a soup containing protein dumplings.

EXAMPLE 4

A protein-containing cake or loaf that could be cut into slices which could be deep fried in fat was prepared by intimately mixing together the following ingredients:
  500 kilograms cheddar cheese containing 25 percent protein on a dry-weight basis
  300 kilograms cottage cheese containing 18 percent protein on a dry-weight basis
  300 kilograms water
  20 kilograms sodium chloride and seasoning
  100 kilograms dry powdered hen egg white
Alignot proportions of this mixture, in which the ratio of albumin to other proteins which show syneresis is 36:64, were then distributed into sealed block-shaped metal pans lined with foil and heated therein at a temperature of 100°C for a period of 60 minutes. After cooling, the resulting loaves were cut into firm slices and deep fried in fat.

EXAMPLE 5

A fish-containing cake or loaf that could be cut into slices which could be deep fried in fat was made by intimately mixing together the following ingredients:
  500 kilograms shredded fish filet containing 20 percent protein on a dry-weight basis
  500 kilograms rennet bovine milk curd containing 10 percent protein on a dry-weight basis
  15 kilograms sodium chloride
  1 kilogram seasoning
  20 kilograms powdered dried blood albumin containing 70 percent by weight of albumin
  10 kilograms freeze-dried powdered whey containing 10 percent by weight of lactalbumin
  100 kilograms dried powdered hen egg white containing 95 percent by weight of albumin
The mixture, in which the ratio of albumin to other proteins which show syneresis is 42:58, was then apportioned into sealed block-shaped metal pans lined with foil and heated therein at a temperature of 100°C for a period of 60 minutes. After cooling, the resulting loaf was cut into firm slices which were deep fried in fat.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention.

What is claimed as new and desired to be protected by Letters Patent is set forth in the appended claims:

1. A process for producing a foodstuff containing a high content of protein in the form of a cake or loaf that can be cut into firm slices and which can be further cooked by boiling, baking, roasting, sauteeing, or deep frying without crumbling which comprises preparing an intimate mixture consisting essentially of an albumin or globulin and a water-containing natural protein-containing food that is subject to syneresis of the group consisting of milk curds containing casein, milk curd coprecipitates containing casein and lactalbumin, whey protein, fresh and ripened cheeses, and soybean curd, in which mixture the ratio of albumin or globumin or globulin to the other protein which show syneresis, on a dry-weight basis is between 20:80 and 50:50, placing the same mixture into a mold or container and heating the mixture therein at a temperature between 80 and 100°C for a period between 5 and 60 minutes.

2. A process as defined in claim 1 in which the hydrogen-ion concentration of the mixture before heating is adjusted to a value corresponding to a pH between 4.0 and 6.4.

3. A process as defined in claim 1 in which the product is sliced and the resulting slices are subjected to further drying by freeze drying or by passing hot air thereover.

4. A process as defined in claim 1 in which the albumin is fresh or dried hen egg white.

5. A process as defined in claim 1 in which the water-containing natural protein-containing food that is subject to syneresis is bovine milk curd.

6. A process as defined in claim 1 in which the water-containing natural protein-containing food that is subject to syneresis is soybean curd.

7. A process as defined in claim 1 in which the water-containing natural protein-containing food that is subject to syneresis is a milk coprecipitate containing casein and lactalbumin that was prepared by adding calcium chloride to a warm solution of bovine milk.

8. A process as defined in claim 1 in which the water-containing natural protein-containing food that is subject to syneresis is cottage cheese.

9. A process as defined in claim 1 in which ground beef is included in the mixture before the mixture is heated.

10. A process as defined in claim 1 in which pieces of fish are included in the mixture before the mixture is heated.

* * * * *